J. C. MACFARLANE, H. BURGE & A. WILLIAMS.
MEANS FOR CONTROLLING ELECTRICALLY OPERATED DRIVING SYSTEMS.
APPLICATION FILED DEC. 22, 1911.
1,019,676.     Patented Mar. 5, 1912.
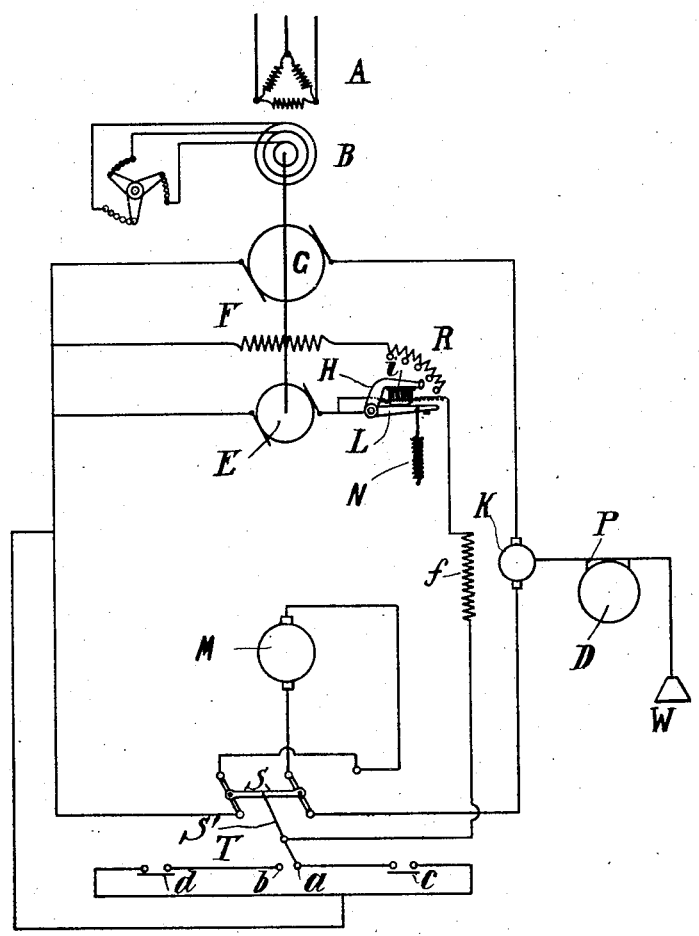

UNITED STATES PATENT OFFICE.

JAMES COLQUHOUN MACFARLANE AND HARRY BURGE, OF CHELMSFORD, AND ALAN WILLIAMS, OF LONDON WALL, LONDON, ENGLAND, ASSIGNORS TO CROMPTON & COMPANY, LIMITED, OF CHELMSFORD, ENGLAND.

MEANS FOR CONTROLLING ELECTRICALLY-OPERATED DRIVING SYSTEMS.

1,019,676. Specification of Letters Patent. Patented Mar. 5, 1912.

Application filed December 22, 1911. Serial No. 667,367.

*To all whom it may concern:*

Be it known that we, JAMES COLQUHOUN MACFARLANE and HARRY BURGE, residing at Arc Works, Chelmsford, in the county of Essex, England, and ALAN WILLIAMS, residing at Salisbury House, London Wall, London, England, all subjects of the King of Great Britain, have invented certain new and useful Improvements in Means for Controlling Electrically-Operated Driving Systems, of which the following is a specification.

This invention relates to controlling devices for use in connection with electrically-operated driving systems wherein wide variations in torque and speed occur while the demand for power from the supply is restricted, and the invention has for object to provide an improved braking gear and safety gear, for use in such systems.

Electrically-operated hauling or winding machinery possesses the characteristics above referred to, and the invention will be hereafter described, by way of example, in connection therewith.

In an electrically-operated hauling or winding system arranged in accordance with this invention the hauling or winding motor is supplied with energy from a direct current generator provided with a variable field excitation so that it is capable of delivering current to said hauling or winding motor at any voltage from zero to a maximum voltage. In this instance the field of the said generator is however not reversible and a reversing switch is therefore inserted in the main circuit for reversing the direction of rotation of the working motor. But in cases where the load is exceptionally heavy as for example in electrically-driven rolling-mill plants, the generator or other field may be reversible and said reversing switch in the main circuit may be replaced by compound reversing switches acting on such fields as may require reversal.

The invention comprises a brake of peculiar construction which operates on the hauling or winding gear, said brake being held normally "on" by means of a spring or weight and being taken "off" by the torque exerted by the armature of a motor hereinafter called the brake motor. The armature of said brake motor is capable only of the limited rotation necessary to move the brake into its "off" position, and may be traversed by the main current, and the field of said brake motor which is of a fine wire type may be excited from the brushes of the exciter of the main generator, or vice versa. A brake of this type has certain advantages; it only allows the haulage gear to rotate freely when the current flowing through the armature of the brake motor is in the forward direction. If there is any tendency for the motors to regenerate, that is to say to return current to the line, the torque set up by the brake motor will act in the same sense as the spring or weight and will tend to apply the brake harder than before. This arrangement not only effectually prevents the cage from descending at an excessive speed but also is of great value in cases in which the direct current generator is driven by a motor drawing power from an electrical circuit or from a mechanical prime mover, because under these conditions the return of power to such circuit or prime mover may be undesirable. A further advantage of this form of electric brake is that on failure of either the main current or the exciting current the brake is at once applied. In this instance the regulation of the motors is obtained by varying the excitation of the generator from zero to a maximum, but the motors are reversed by reversing the main current. In order that the reversal of the main current may not take place when the switch is carrying a heavy current the following safety device is adopted. The controller handle is not directly connected to the contact lever of the generator field regulator but the connection thereto is formed in a well-known manner electrically by means of an electro-magnet. Arrangements are provided by which the contact lever is capable of being withdrawn positively by means of a spring to the position of no excitation. The electro-magnet connecting the hand lever to the contact lever is included in the same circuit which excites the aforesaid brake motor and in said circuit is arranged a make and break switch such that this circuit is broken prior to the opening of the main circuit or other reversing switch. The operation of the reversing switch therefore entails the previous deënergizing of both the brake motor and the said electro-magnet so that before the main current or the necessary field circuits can be reversed, the brake will be applied and the contact lever controlling the field of the generator will be released and will return to zero, thus causing the generator to lose its excitation. A further safety device to prevent overwinding is inserted in the said circuit. If the cage is overwound in one direction the effect is to break the local circuit which applies the brake and causes the generator to lose its excitation, and the said circuit cannot be reëstablished and the generator reëxcited until the reversing switch has been thrown over so as to produce a reverse motion of the cage.

The accompanying drawings illustrate diagrammatically and by way of example, a haulage or winding system arranged according to this invention.

A is the stator and B is the rotor of a three-phase alternating current electric motor direct coupled to the armature G of a direct current generator.

M is the working motor connected to the brushes of the generator G through the reversing switch S and the armature of the brake motor K.

The generator G is provided with a separately excited field winding F whereof the excitation is produced by the exciter E or other suitable source, a variable hand controlled resistance R being inserted in the circuit thereof operated in the well-known manner by a magnetically controlled contact lever L. The armature K of the brake motor is connected mechanically to the brake P on the cage or winding drum D in such a way that while the weight W applies the brake, the torque exerted by the armature K when traversed by a current in the positive direction will overcome the effect of the weight W and take off the brake P. The contact lever L is maintaind normally in the zero position of no excitation (as shown on the drawing) by the spring N and hand lever H makes connection therewith by means of the electro-magnet $i$ so that when said electro-magnet is deënergized, the lever L will swing back to the zero position of no excitation from which position it cannot again be moved until the said electro-magnet has again been energized.

The electro-magnet $i$ and the fine wire field winding $f$ of the brake motor K are energized from the exciter E and in such circuit is included a two-way pilot switch T operating by the handle of the reversing switch S by means of a mechanical connection S', so that when the reversing switch is in position for hauling as shown in the diagram the pilot switch T makes contact with a contact $a$ and when the switch S is in position for lowering said pilot switch makes contact with the contact $b$.

$c$ is a switch which is opened on the cage being overwound in the upward direction, and $d$ is a switch which is opened positively when the cage is overwound in the downward direction.

When the cage is ascending the circuit under consideration leads from the exciter brush through the electro-magnet $i$ and through the field winding $f$ of the brake motor K thence through the pilot switch T and the switch $c$ back to the exciter. When the cage is descending the circuit is the same, with the exception that the current traverses the switch $d$ instead of the switch $c$, and the contact $b$ instead of the contact $a$. The effect of this arrangement is as follows:—If the excitation or the winding motor circuit fails or the motors are overwound in either direction, the brake is applied, the lever L returns to its zero position and if overwinding has occurred connection cannot be reëstablished between the handle H and the lever L until the reversing switch S has been thrown over and the pilot switch T has passed from contact with $a$ to contact with $b$ or vice versa. Moreover, should on the descent of the cage, the motor M tend to regenerate which is considered objectionable in some cases the reversal of current through the brake motor K will increase the braking effect and so effectually prevent any regeneration.

It is to be understood that the invention is not limited in its application to hauling or winding machinery, but may be utilized in connection with numerous other electrically operated driving systems having the characteristics set out above.

What we claim is:—

1. An electrically-operated driving system comprising a driven generator, a driving motor, mains carrying current from said driven generator to said driving motor, a variable separate excitation to said generator, a mechanical brake, a direct current brake-motor, said brake being normally on and being pulled off by said direct current brake-motor, the armature of said brake motor being connected in series with said driven generator, the field of said brake motor being excited from the same source of excitation as said generator.

2. An electrically-operated driving system comprising a driven generator, a driving motor, mains carrying current from said driven generator to said driving motor, a variable separate excitation to said generator, a mechanical brake, a direct current brake-motor, said brake being normally on and being pulled off by said direct current brake-motor, said brake motor having an armature and a field one of which elements is connected in series with the driven generator and the other element being connected to the said source of excitation for the generator.

3. An electrically-operated driving system comprising a driven generator, a driving motor, mains carrying current from said driven generator to said driving motor, a variable separate excitation to said generator, a mechanical brake, a direct current brake-motor, said brake being normally on and being pulled off by said direct current brake-motor, the armature to said direct current brake-motor being connected in series with said driven generator, the field to said direct current brake-motor being excited from the same source of excitation as said generator, an electro-magnet in series with said field of said direct current brake-motor, an operating handle, a voltage control lever, said electro-magnet connecting said operating handle to said voltage control lever, a pilot switch in series with the field of said direct current brake-motor, and overwinding switches also in series with the field of said direct current brake-motor.

4. An electrically-operated driving system comprising a driven generator, a driving motor, mains carrying current from said driven generator to said driving motor, a variable separate excitation to said generator, a mechanical brake, a direct current brake-motor, said brake being normally on and being pulled off by said direct current brake-motor, said direct current brake-motor having an armature and a field, one of said elements being excited from the same source of excitation as said generator, and the other element of the brake motor being connected in series with said driven generator, an electro-magnet in series with one of said elements of said direct current brake-motor, an operating handle, a voltage control lever, said electromagnet connecting said operating handle to said voltage control lever, a pilot switch in series with the other element of said direct current brake-motor, and overwinding switches also in series with the armature of said direct current brake-motor.

In testimony whereof we have hereunto set our hands in presence of two subscribing witnesses.

JAMES COLQUHOUN MACFARLANE.
HARRY BURGE.
ALAN WILLIAMS.

Witnesses:
NEVILLE E. BROOKES,
ERNEST JOHN HILL.